United States Patent
Lee (10) Patent No.: US 6,782,731 B2
(45) Date of Patent: Aug. 31, 2004

(54) SYSTEM FOR ANALYZING A SUSPENSION SYSTEM

(75) Inventor: Un Koo Lee, Kyungki-do (KR)

(73) Assignee: Hyundai Motor Company, Seocho-Ku (KR)

( * ) Notice: Subject to any disclaimer, the term of this patent is extended or adjusted under 35 U.S.C. 154(b) by 139 days.

(21) Appl. No.: 10/081,749

(22) Filed: Feb. 20, 2002

(65) Prior Publication Data

US 2002/0113396 A1 Aug. 22, 2002

(30) Foreign Application Priority Data

Feb. 21, 2001 (KR) .......................................... 2001-8675

(51) Int. Cl.[7] .......................................... G01M 17/04
(52) U.S. Cl. .................................... 73/11.07; 73/118.1
(58) Field of Search ............................ 73/11.04, 11.05, 73/11.07, 11.08, 11.09, 669, 670, 118.1, 121

(56) References Cited

U.S. PATENT DOCUMENTS

| | | | | |
|---|---|---|---|---|
| 5,967,536 A | * | 10/1999 | Spivey et al. | 280/124.141 |
| 5,997,038 A | * | 12/1999 | Dostert et al. | 280/781 |
| 6,017,044 A | * | 1/2000 | Kawagoe | 280/124.106 |
| 6,036,201 A | * | 3/2000 | Pond et al. | 280/5.514 |
| 6,076,840 A | * | 6/2000 | Kincaid et al. | 280/124.07 |
| 6,089,582 A | * | 7/2000 | Hasshi | 280/93.512 |
| 6,116,626 A | * | 9/2000 | Cherry et al. | 280/124.135 |
| 6,254,114 B1 | * | 7/2001 | Pulling et al. | 280/93.511 |
| 6,446,993 B1 | * | 9/2002 | Huszarik et al. | 280/124.177 |
| 6,481,079 B1 | * | 11/2002 | Newhan | 29/401.1 |

* cited by examiner

*Primary Examiner*—Eric S. McCall
(74) *Attorney, Agent, or Firm*—Morgan Lewis & Bockius LLP (57) ABSTRACT

A system for analyzing a suspension system is provided which includes: a frame assembly including a plurality of frame units, a base plate, a lower mounting unit, and an upper mounting unit; a wheel assembly including a wheel member and a wheel mounting assembly for enabling mounting of the wheel member to the upper and lower mounting units of the frame assembly through a suspension; a steering assembly provided to one side of the frame assembly and being connected to the wheel mounting assembly of the wheel assembly; a strut assembly including a shock absorber and a suspension spring and being provided between the wheel assembly and the frame assembly; and an arm assembly including a plurality of arms and links and being provided between the wheel assembly and the frame assembly.

10 Claims, 5 Drawing Sheets

SYSTEM FOR ANALYZING A SUSPENSION SYSTEM

FIELD OF THE INVENTION

The present invention relates to a system for analyzing a suspension system. More particularly, the present invention relates to a system, in which, to enable better analysis of the manner that wheel movement characteristics (e.g., camber, toe, and caster) in an independent suspension system are affected by a mounting position and length of each link in a steering system and suspension system, the mounting position and length of the links may be varied as desired to allow visual observation of the wheel movement characteristics.

BACKGROUND OF THE INVENTION

Vehicles generally include a suspension system that is mounted between the vehicle frame and wheels. The connection to the frame and wheels is realized through links, and the suspension system acts to absorb shocks and vibrations received from the road through the wheels, thereby improving comfort and safety. In more detail, the suspension system includes springs and shock absorbers for cushioning shocks and vibrations in a generally vertical direction, and various arms and rods for providing additional support in the same and other directions by providing a suitable combination of rigidity and elasticity.

The suspension system as structured in the above is required to perform a variety of functions. First, the suspension system must provide comfort to passengers by absorbing shocks. Second, side-to-side rocking of the vehicle, resulting from abrupt steering operations by the driver or when driving on a curve, must be minimized by the suspension system to thereby provide comfort and better control over the vehicle by the driver. Third, it is necessary that the suspension system exert a downward force such that a suitable degree of contact force is maintained between the tires and road surface, thereby enhancing safety, particularly when cornering or braking.

Drive comfort and stability are affected by the weight of the vehicle, distribution of the weight of the vehicle, road conditions, tire and wheel alignment, and the suspension system. In addition, the suspension system, together with the steering system, greatly affects handling (i.e., turning, tracking, and cornering performance). A large variety of different types of suspension systems have been developed, all with the goal of optimally providing the required functions of the suspension system. Relatively recently, there has been an increased need for high-performance suspension systems that are more responsive so as to better meet demands for enhanced performance by consumers, and to better suit the ever more powerful sports vehicles that are being developed.

The independent suspension system was developed out of such demands. The different types of independent suspension systems include the Macpherson suspension system, which is structurally simple and lightweight, and in which struts that determine the positioning of wheels are used as shock absorbers; the double wishbone suspension system, which is somewhat expensive but suitable for application to high-performance vehicles with its A-type arms; and the multi-link suspension system, which is similar to the double wishbone suspension system but uses a plurality of links.

Figure 7:
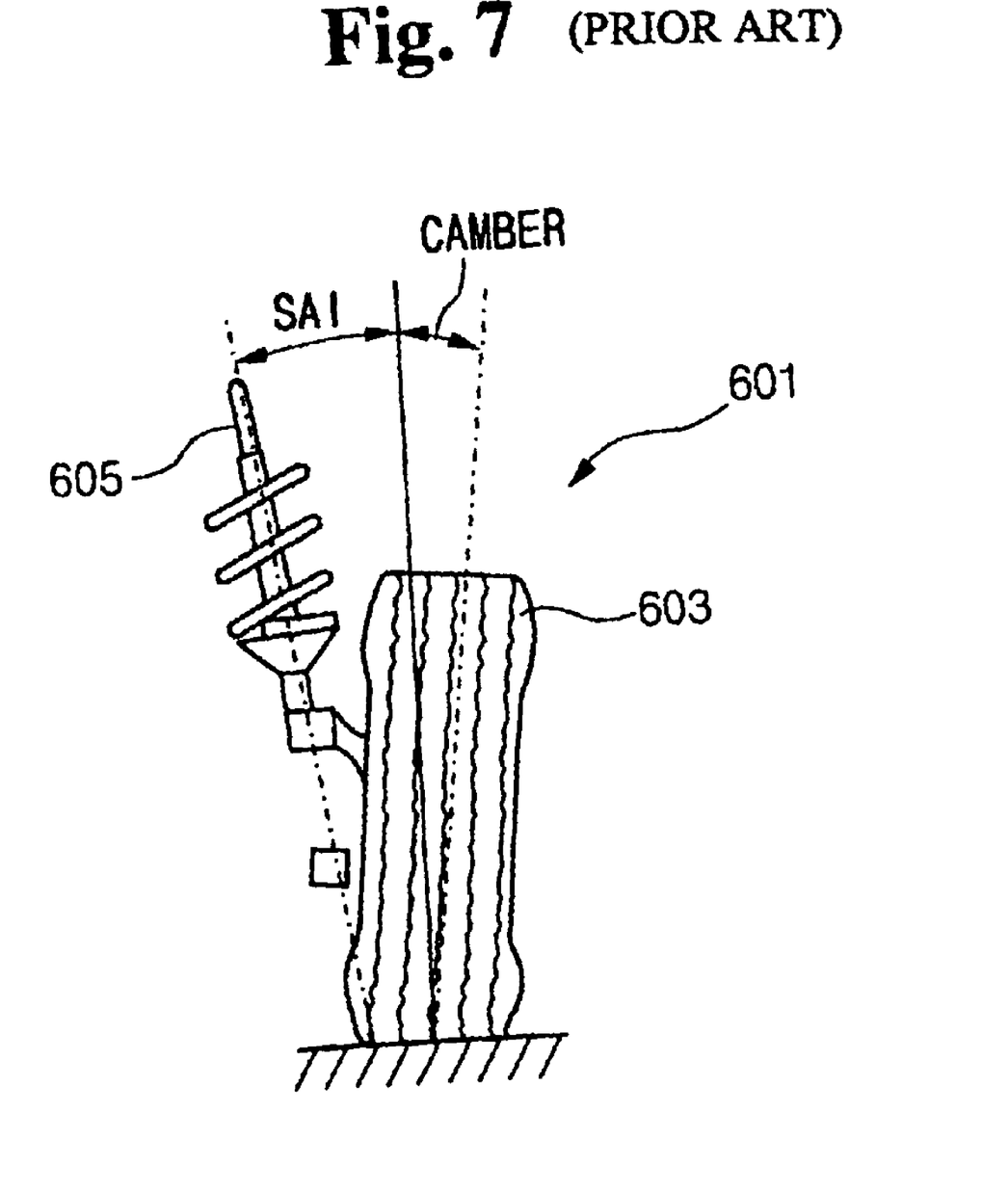
FIG. 7 is a front perspective view of a conventional analysis system that enables observation of camber variations of a suspension system during steering.

Such independent suspension systems are structurally complicated such that it is difficult to determine how characteristic wheel movement (e.g., camber, toe, and caster) is affected during steering and bouncing. In the prior art, a system has been developed that enables visual analysis of only one such movement characteristic at a time, such as camber variations during steering. That is, with reference to FIG. 7, an analysis system 601 provides a model in which a wheel 603 is fixed to a kingpin shaft (shock absorber) 605 to make observations such as changes in camber.

However, in order to maximize the drive stability, handling, and ride comfort of the independent suspension system, a three-dimensional model is needed to more concretely and simply understand the structural characteristic movements of the independent suspension system. But there has not been any development of testing or analysis equipment that realize all the structural movements of the independent suspension system.

Further, analysis systems that can realize all the geometric characteristics during steering and bouncing in typical independent suspensions system such as the double wishbone, Macpherson strut, and multi-link suspension system have not been developed.

SUMMARY OF THE INVENTION

According to a preferred embodiment of the present invention, a system is provided for analyzing a suspension system comprising: a frame assembly including a plurality of frame units, a base plate, a lower mounting unit, and an upper mounting unit; a wheel assembly including a wheel member that functions as a wheel, and a wheel mounting assembly for enabling mounting of the wheel member to the upper and lower mounting units of the frame assembly through a suspension; a steering assembly provided to one side of the frame assembly and being connected to the wheel mounting assembly of the wheel assembly, the steering assembly performing a steering function through a rack-and-pinion operation; a strut assembly including a shock absorber and a suspension spring and being provided between the wheel assembly and the frame assembly, the strut assembly being able to undergo variations in mounting positions and length between its connection to the wheel mounting assembly of the wheel assembly and the upper mounting unit of the frame assembly; and an arm assembly including a plurality of arms and links and being provided between the wheel assembly and the frame assembly, the arm assembly being able to undergo variations in mounting positions and length between its connection to the wheel mounting assembly of the wheel assembly and the lower mounting unit of the frame assembly.

In a preferred embodiment of the present invention, the frame units of the frame assembly comprise: first and second frame units provided in parallel at a predetermined distance; a third frame unit interconnecting the first and second frame units; and fourth frame units provided extending upward from (i.e., substantially perpendicular to) each of the first and second frame units, and wherein the base plate of the frame assembly is provided on top of the fourth frame units and comprises: first and second skirts that extend downward from longitudinal edges of the base plate and which are fixed to the fourth frame units; a pair of receiving slots formed at a predetermined spacing in each of the skirts and which act as a guide for the lower mounting unit; an integrally formed section that extends outward from substantially an upper face of the base plate and perpendicular to the second skirt, on which the steering assembly is provided; guide housings mounted on opposite sides of the base plate extending vertically upward; and slide bars slidably provided in the guide housings and able to be fixed at a desired position therein using bolts that pass through bolt holes formed in the guide housings.

In a further preferred embodiment of the present invention, the upper mounting unit is provided on upper ends of the slide bars and comprises a mounting plate that extends from one slide bar to the other and is fixed to upper ends thereof; and adjustable mounts, each of which is fixed to an opposite end of the mounting plate, one end of each of the adjustable mounts including one connecting slot and a pair of slide slots for enabling fixing and position adjustment on the mounting plate, and connecting slots being formed on opposite ends of the adjustable mounts to which the strut assembly is connected.

According to yet another embodiment of the present invention, the lower mounting unit is realized through an arm connecting plate that passes through one of the receiving slots in the skirt and a corresponding receiving slot in the opposing skirt, the first arm connecting plate including connecting slots that are formed at a predetermined length along a longitudinal direction of the arm connecting plate and on both ends thereof, and the arm connecting plate including a threaded bolt hole at a center position thereof, a bolt being screwed into the bolt hole until making close contact with the base plate to fix a position of the arm connecting plate.

According to still yet another embodiment of the present invention, the wheel member of the wheel assembly is a circular plate made of a transparent plastic material.

According to still yet another embodiment of the present invention, the wheel mounting assembly of the wheel assembly comprises: a connecting bracket, which is coupled to the wheel member through a plurality of bolts at a position slightly below a center of the wheel member; a knuckle bracket, which is connected to the wheel member through a plurality of bolts at a position slightly above the center of the wheel member, a lower end of the strut assembly being connected to the knuckle bracket; and a knuckle plate fixed to a rear portion of the knuckle bracket and having a slot for connection with the steering assembly.

According to still yet another embodiment of the present invention, the steering assembly is mounted on the base plate on the section extending outwardly from the second skirt and comprises: a rack bar that extends in a longitudinal direction of the base plate, and which undergoes rectilinear motion while being guided by a guide, the rack bar including a rack segment that is formed at a center thereof and at a predetermined length with adjustable segments formed on both ends of the rack bar; a pinion meshed with the rack segment of the rack bar; a rotating bar passed through a center of the pinion, one end of the rotating bar being rotatably connected to a support bracket, which is fixed to the base plate, and a control knob being formed on its other end; and a knuckle arm connected via a universal joint to each extreme end of the rack bar, ball joints being provided at the ends of the knuckle arms, the ball joints corresponding to the side of the system being used and being connected to the wheel mounting assembly of the wheel assembly.

According to still yet another embodiment of the present invention, the adjustable segments of the rack bar comprise: a hollow tube that has a groove of a large width formed along a predetermined length of the hollow tube; and a rod, a majority of which is slidably provided within the hollow tube, a threaded bolt hole being formed in the rod, and a fixing bolt being screwed into the bolt hole via the groove of the hollow tube.

According to still yet another embodiment of the present invention, the shock absorber of the strut assembly comprises: a housing, which is a hollow tube and includes a lower spring seat integrally formed on an upper end thereof; a piston rod passed through the lower spring seat into the housing such that the housing is able to undergo variations in position such that a length between its connection to the wheel mounting assembly and the upper mounting unit of the frame assembly; and a upper spring seat integrally formed to an upper end of the piston rod, and wherein the suspension spring of the strut assembly is interposed between the lower spring seat and the upper spring seat, and is made of a plastic material.

According to still yet another embodiment of the present invention, the arm assembly comprises: an A-shaped arm link, which includes a plurality of slots and is connected to the wheel mounting assembly of the wheel assembly through a ball joint; and a plurality of adjustable arms connected to the slots of the A-shaped link through ball joints, opposite ends of the adjustable arms being connected to the lower mounting unit of the wheel assembly through ball joints, the adjustable arms able to undergo variations in length.

According to still yet another embodiment of the present invention, each of the adjustable arms comprises a hollow tube; threaded inserts of a predetermined length fixed within opposite ends of each of the adjustable arms; bolts screwed into the threaded inserts, the ball joints connected to the A-shaped link being integrally formed to distal ends of the bolts, the threading of the bolts in relation to the inserts being such to allow the length of the adjustable arms to be varied by manually rotating the hollow tube portion of the adjustable arms.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

The present invention provides a suspension system model that has structural elements similar to or the same as an actual apparatus for realizing all geometric characteristics of the Macpherson suspension system.

Figure 1:
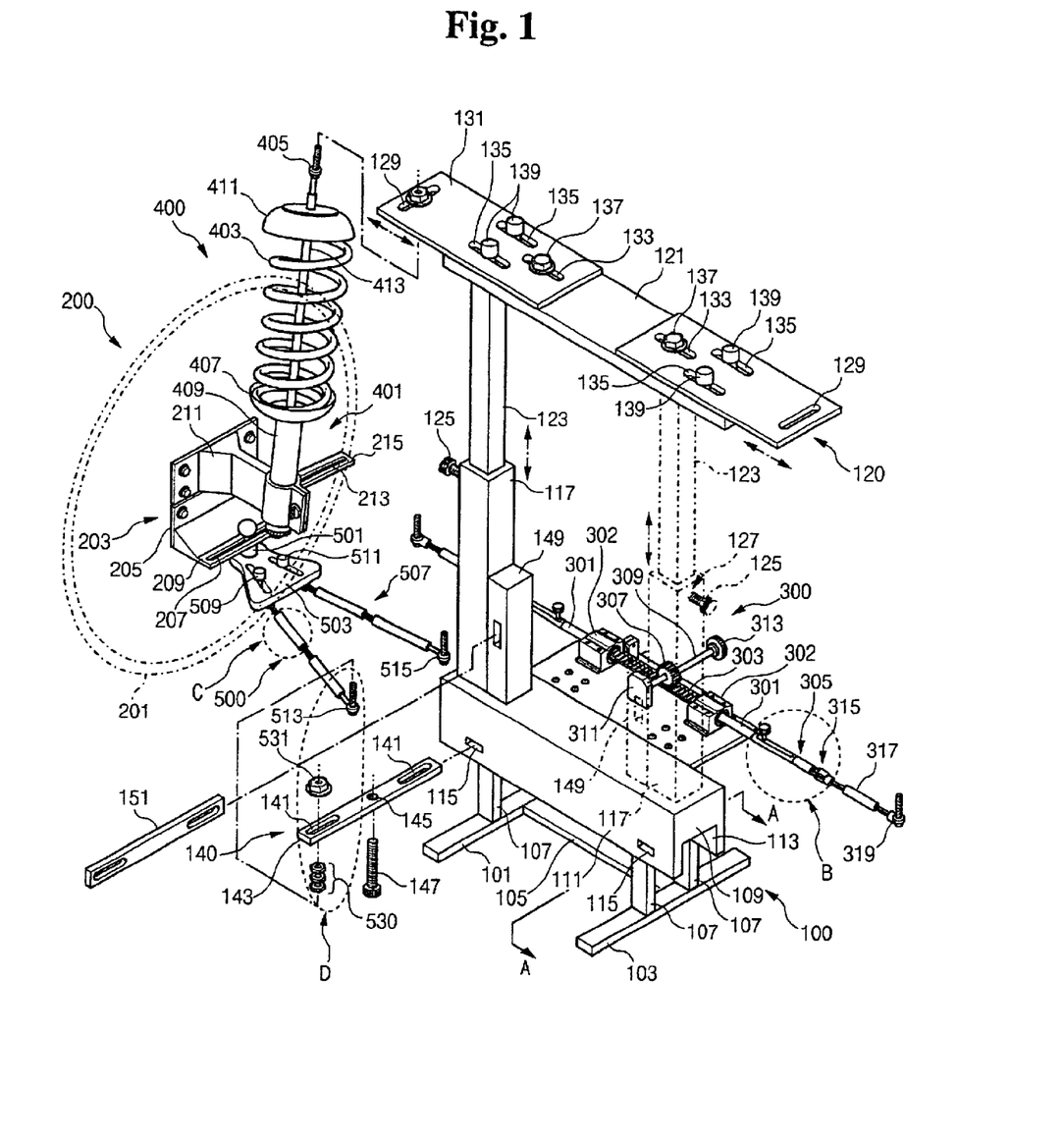
FIG. 1 is an exploded perspective view of a system for analyzing geometric characteristics of a suspension system according to a preferred embodiment of the present invention.

As shown in FIG. 1, a system for analyzing geometric characteristics of a Macpherson suspension system includes: a frame assembly 100, on which a front or rear-wheel suspension is mounted; a wheel assembly 200 for performing the function of a front or rear wheel; a steering assembly 300 connected to the wheel assembly 200 on the frame assembly 100 to perform a steering function; a strut assembly 400 including a shock absorber 401 and a suspension spring 403; and an arm assembly 500 including a plurality of arms and links.

The frame assembly 100 includes a plurality of frame units 101, 103, 105, and 107, as well as a base plate 109. The frame assembly 100 also includes an upper mounting unit 120 and a lower mounting unit 140. A wheel is mounted to these elements of the frame assembly 100 via a suspension such that the frame assembly 100 functions as a vehicle frame.

To describe the elements of the frame assembly 100 in more detail, the frame units 101 and 103 are provided in parallel at a predetermined distance, and the frame unit 105 interconnects the frame units 101 and 103 at substantially a center thereof. A pair of the frame units 107 is provided extending upward from (i.e., substantially perpendicular to) each of the frame units 101 and 103.

The base plate 109 is provided on top of the frame units 107, extending to a length matching or somewhat exceeding that defined by the spacing of the frame units 101 and 103. The base plate 109 includes skirts 111 and 113 that extend downward from longitudinal edges of the base plate 109, and which are fixed to the frame units 107. A pair of receiving slots 115 is formed at a predetermined spacing in each of the skirts 111 and 113 at a lower portion thereof. The receiving slots 115 act as a guide for the lower mounting unit 140. The base plate 109 also includes an integrally formed section that extends outward from substantially an upper face thereof and is perpendicular to the skirt 113. The steering assembly 300 is provided on this section.

Further, guide housings 117 are mounted on opposite ends of the base plate 109 extending vertically, and slide bars 123 are slidably provided in the guide housings 117. The slide bars 123 are fixed at a desired position using first bolts 125, which are threaded and pass through threaded first bolt holes 127 formed in the guide housings 117 to make contact with the slide bars 123. Accordingly, the slide bars 123 are fixed at a desired position by tightening the first bolts 125 to make close contact with the slide bars 123.

The upper mounting unit 120 is provided on an upper end of the slide bars 123. The upper mounting unit 120 includes a mounting plate 121 that extends from one slide bar 123 to the other and is fixed to the upper end thereof. The upper mounting unit 120 also includes adjustable mounts 131, each of which is fixed to an opposite end of the mounting plate 121 and along the same direction as the mounting plate 121 lays. One end of each of the adjustable mounts 131 includes one first connecting slot 133 and a pair of slide slots 135. A second bolt 137 passes through each of the first connecting slots 133 for connection to the mounting plate 121, and guide rods 139, which are fixed to the mounting plate 121, pass through the slide slots 135. With this configuration, the position of the adjustable mounts 131 may be varied. Also, distal ends of the adjustable mounts 131 extend outward a predetermined distance from the mounting plate 121, and second connecting slots 129 are formed on these ends of the adjustable mounts 131. The shock absorber 401 of the strut assembly 400 is connected to one of the second connecting slots 129 (i.e., on an end of the system being used) through a first ball joint 405.

Figure 2:
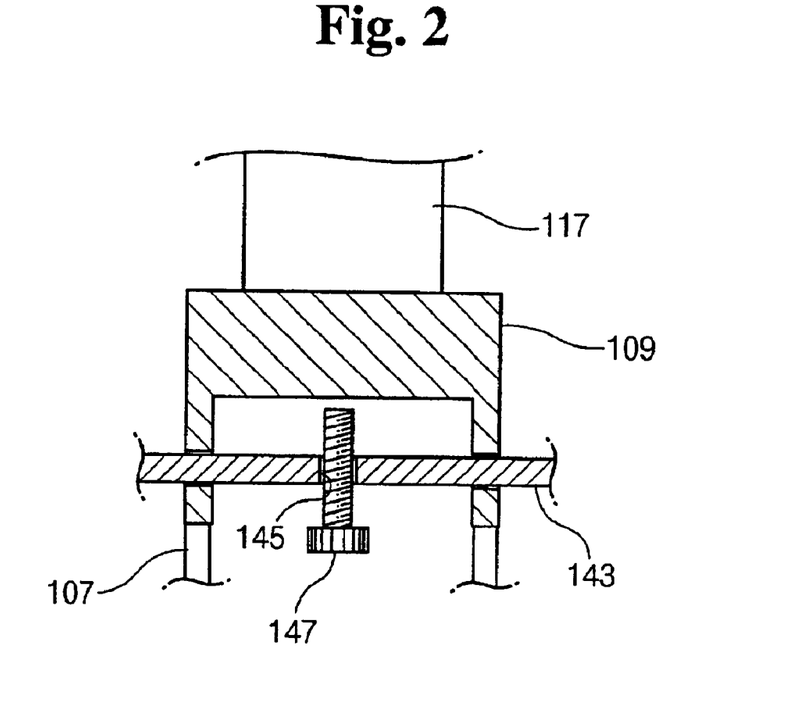
FIG. 2 is an enlarged view taken along line A—A of FIG. 1.

The lower mounting unit 140 is realized through a first arm connecting plate 143 that passes through one of the receiving slots 115 in the skirt 111 and a corresponding receiving slot 115 in the opposing skirt 113 (i.e., the receiving slots 115 on an end of the system being used). The first arm connecting plate 143 includes third connecting slots 141 that are formed at a predetermined length along a longitudinal direction of the first arm connecting plate 143 and on both ends thereof. The first arm connecting plate 143, with reference to FIG. 2, includes a threaded second bolt hole 145 at a center position thereof. With the first arm connecting plate 143 passed through a pair of corresponding receiving slots 115 of the skirts 111 and 113, a third bolt 147 is screwed into the second bolt hole 145 until making close contact with the base plate 109 to fix the position of the first arm connecting plate 143.

The wheel assembly 200 is realized through a wheel member 201 and a wheel mounting assembly 203, which mounts the wheel member 201 to the frame assembly 100 through a suspension. It is preferable that the wheel member 201 is made of a transparent plastic material to allow for the unobstructed observation of the movement characteristics of the suspension. The wheel mounting assembly 203 includes a connecting bracket 205, which is coupled to the wheel member 201 through a plurality of bolts at a position slightly below a center of the wheel member 201. A slot plate 209 is integrally formed to the connecting bracket 205. The slot plate 209 has a glide slot 207 to which the arm assembly 500 is connected.

Further, the wheel mounting assembly 203 includes a knuckle bracket 211, which is connected to the wheel member 201 through a plurality of bolts at a position slightly above the center of the wheel member 201 (i.e., directly above the connecting bracket 205). A lower end of the shock absorber 401 of the strut assembly 400 is connected to the knuckle bracket 211. The knuckle bracket 211 includes a knuckle plate 215 having a fourth connecting slot 213 for connection with the steering assembly 300.

The steering assembly 300 is mounted on the base plate 109 on the section extending outwardly from the skirt 113. The steering assembly 300 is connected to the knuckle plate 215 of the wheel assembly 200, and performs a steering operation through a rack-and-pinion configuration. In more detail, the steering assembly 300 includes a rack bar 301 that extends in the longitudinal direction of the base plate 109, and which undergoes rectilinear motion while being guided by a guide 302. The rack bar 301 includes a rack segment 303 that is formed at a center thereof and at a predetermined length, and adjustable segments 305 formed on both ends of the rack bar 301.

A pinion 307 is meshed with the rack segment 303 of the rack bar 301. The pinion 307 is connected to a rotating bar 309 that passes through a center of the pinion 307. One end of the rotating bar 309 is rotatably connected to a support bracket 311, which is fixed to the base plate 109, and a control knob 313 is formed on its other end. Further, a knuckle arm 317 is connected via a universal joint 315 to each extreme end of the rack bar 301. Second ball joints 319 are provided at the ends of the knuckle arms 317, and a distal end of the knuckle arm 317 corresponding to the side of the system being used is connected to the knuckle plate 215 of the wheel assembly 200.

Figure 3:
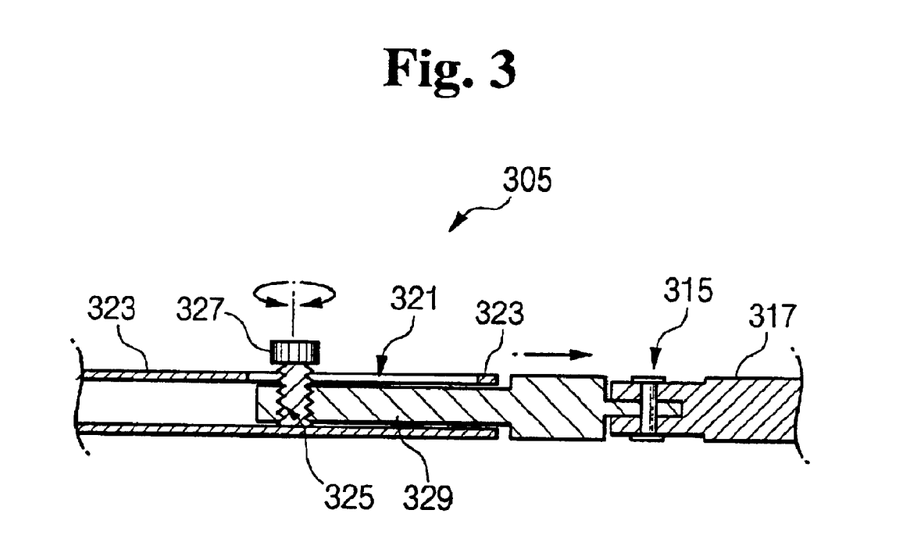
FIG. 3 is an enlarged view of area B of FIG. 1.

Each of the adjustable segments 305 of the rack bar 301, with reference to FIG. 3, includes a hollow tube 323 that has a groove 321 of a large width formed along a predetermined length of the hollow tube 323, and a rod 329, the majority of which is slidably provided within the hollow tube 323. A threaded third bolt hole 325 is formed in the rod 329, and a fixing bolt 327 is screwed into the third bolt hole 325. After setting the position of the rod 329 within the hollow tube 323, the fixing bolt 327 is tightened until making close contact with an inner surface of the hollow tube 323 such that the position of the rod 329 is fixed.

The strut assembly 400, which includes the shock absorber 401 and the suspension spring 403 as described above, is provided between the wheel assembly 200 and the frame assembly 100. The strut assembly 400 is mounted between the knuckle bracket 211 of the wheel assembly 200 and the frame assembly 100 such that variations may be made in mounting positions and length. The shock absorber 401 of the strut assembly 400 includes a housing 409, which is a hollow tube and has a lower spring seat 407 integrally formed on an upper end thereof, and a piston rod 413, which is passed through the lower spring seat 407 into the housing 409. A upper spring seat 411 is integrally formed to an upper end of the piston rod 413. The suspension spring 403 is interposed between the lower spring seat 407 and the upper spring seat 411. With this configuration, the housing is able to undergo variations in position such that a length between its connection to the wheel mounting assembly of the wheel assembly and the upper mounting unit of the frame assembly can be changed with compression and extension of the suspension spring 403. Preferably, the suspension spring 403 is made of a plastic material and has an elasticity sufficient only to restore all connecting members to an initial position.

The arm assembly 500 is mounted between the slot plate 209 of the wheel assembly 200 and the first arm connecting plate 143 of the frame assembly 100, and includes a plurality of arms and links such that variations in mounting position and length may be realized. In more detail, the arm assembly 500 includes an A-shaped arm link 503, which includes a plurality of slots and is connected to the slot plate 209 at the guide slot 207 through a third ball joint 501. Further, the arm assembly 500 includes adjustable arms 505 and 507, which are connected to the slots of the A-shaped link 503 through fourth ball joints 509 and 511. Opposite ends of the adjustable arms 505 and 507 are connected to the third connecting slots 141 of the first arm connecting plate 143 through fifth ball joints 513 and 515.

Figure 4:
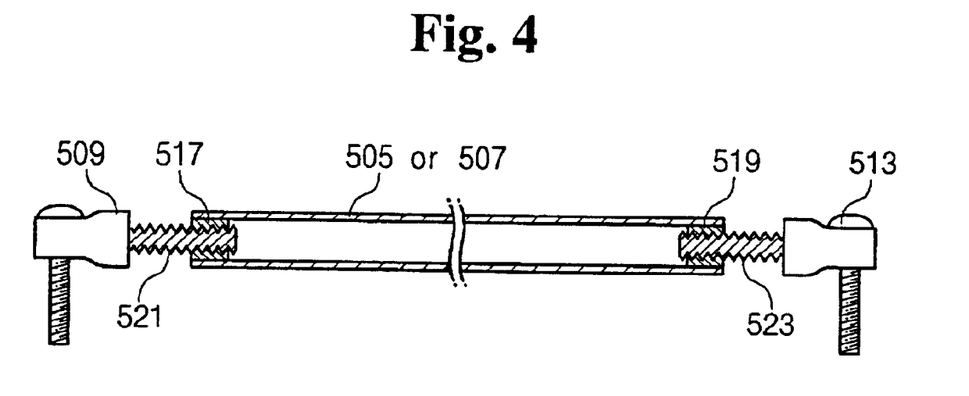
FIG. 4 is an enlarged view of area C of FIG. 1.

A length of the adjustable arms 505 and 507 may be altered. With reference to FIG. 4, each of the adjustable arms 505 and 507 is realized through a hollow tube and includes threaded inserts 517 and 519 of a predetermined length fixed within opposite ends of each of the adjustable arms 505 and 507. Fourth bolts 521 and 523 are screwed into the threaded inserts 517 and 519, respectively, and the fourth ball joints 509 and 511 are integrally formed to distal ends of the fourth bolts 521 and 523, respectively. The threading of the bolts 521 and 523 in relation to the inserts 517 and 519, because they have opposite thread directions, is such to allow the length of the adjustable arms 505 and 507 to be varied by manually rotating the hollow tube portion of the adjustable arms 505 and 507.

Figure 5:
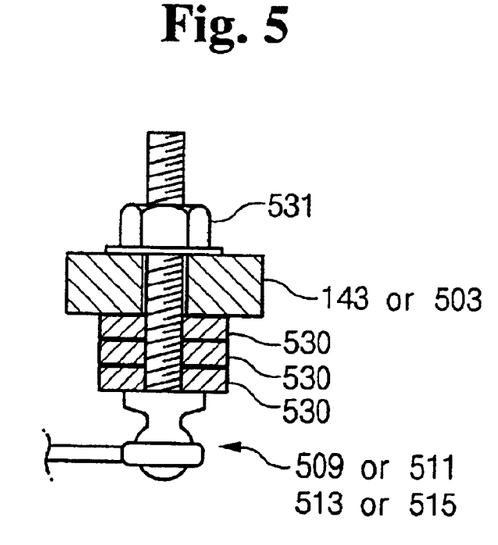
FIG. 5 is an enlarged view of area D of FIG. 1.

The fourth ball joints 509 and 511 realize their connection with the A-shaped link 503, and the fifth ball joints 513 and 515 realize their connection with the first arm connecting plate 143, as shown in FIG. 5. That is, a plurality of washers 530 are interposed between the ball joints 509 and 511 and the A-shaped link 503, as well as between the ball joints 513 and 515 and the first arm connecting plate 143, and nuts 531 are screwed onto the threads provided on a bolt portion of the ball joints 509, 511, 513, and 515 after the bolt portions are passed through the A-shaped link 503 and the first arm connecting plate 143.

In the system for analyzing geometric characteristics of a suspension system as described above, the lower mounting unit 140 may include, in order to enable application of another type of suspension, a connecting block 149 having slots formed at roughly a center portion thereof and which is mounted vertically on the base plate 109 adjacent to the guide housings 117. A second arm connecting plate 151 is passed through the slots of the connecting block 149 on the side of the system being used.

Figure 6:
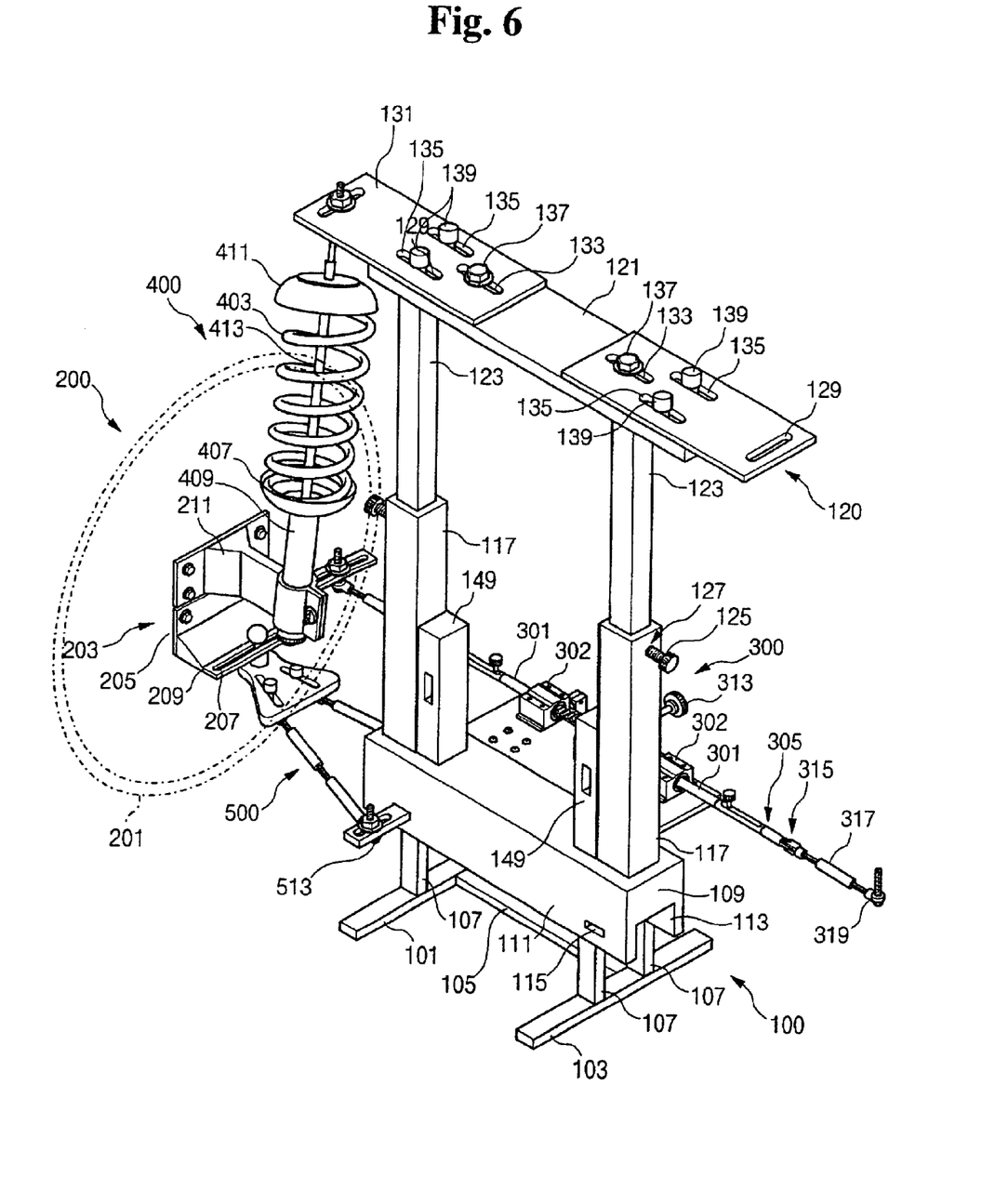
FIG. 6 is a perspective view of the system of FIG. 1 in an assembled state.

After the system of the present invention is assembled, as shown in FIG. 6, steering and bouncing states are observed with different adjustments made in alignment (camber, toe, caster, and kingpin slant angle). Adjustment of camber is realized by rotating the adjustable arms 505 and 507. That is, depending on how the bolts 521 and 523 and the inserts 517 and 519 of the adjustable arms 505 and 507 are threaded, the adjustable arms 505 and 507 are lengthened or shortened by rotating the hollow tube portions of the same in either the clockwise or counterclockwise directions, thereby realizing changes in a camber angle of the wheel member 201. The camber may also be varied according to the positioning of the fifth ball joints 513 and 515 in the third connecting slots 141 of the first arm connecting plate 143.

The kingpin slant angle is typically adjusted by varying the position of the adjustable mounts 131 on the mounting plate 121. Although various other factors are involved in changes in the kingpin slant angle, a detailed description thereof will be omitted. Adjustment of caster is most easily performed by varying the positioning of the first ball joint 405 of the shock absorber 401 within second connecting slot 129 of the adjustable mount 131 (on the side of the system being used).

Adjustment of toe is realized by rotating the adjustable arms 505 and 507 such that the wheel member 201 is adjusted to a toe-in or toe-out position. At this time, the adjustable arms 505 and 507 must be rotated in different directions to realize toe-in or toe-out. Adjustment of toe may also be realized, as with adjustment of camber, by the positioning of the fifth ball joints 513 and 515 in the third connecting slots 141 of the first arm connecting plate 143.

In a state where a wheel alignment adjustment value is set in a suitable range, the control knob 313 is rotated or the wheel member 201 is raised to observe movement characteristics during steering and bouncing.

The system for analyzing a suspension system of the present invention described above provides a three-dimensional model of an independent suspension system using the basic structure of the same such that all the mechanical movement characteristics of the independent suspension system such as camber, toe, and caster may be observed by controlling steering and adjusting mounting positions of the links. Accordingly, the independent suspension system be studied and better understood.

Further, the present invention enables the application of various suspension kits such that the geometric characteristics of a plurality of independent suspension systems, including the Macpherson suspension system, may be realized. As a result, a new model need not be produced for the different types of suspensions, thereby reducing costs.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A system for analyzing a suspension system comprising:

a frame assembly including a plurality of frame units, a base plate, a lower mounting unit, and an upper mounting unit, wherein the frame units comprise:
first and second frame units provided in parallel at a predetermined distance from one another;
a third frame unit interconnecting the first and second frame units; and
fourth frame units extending substantially perpendicular to each of the first and second frame units, and wherein the base plate of the frame assembly is provided on top of the fourth frame units and comprises:
first and second skirts that extend downward from longitudinal edges of the base plate and which are fixed to the fourth frame units;
a pair of receiving slots formed at a predetermined spacing in each of the skirts and which act as a guide for the lower mounting unit;
an integrally formed section that extends outward from substantially an upper face of the base plate and perpendicular to the second skirt, on which the steering assembly is provided;
guide housings mounted on opposite sides of the base plate and extending vertically; and
slide bars slidably provided in the guide housings and able to be fixed at a desired position therein using bolts that pass through bolt holes formed in the guide housings;

a wheel assembly including a wheel member that functions as a wheel, and a wheel mounting assembly for enabling mounting of the wheel member to the upper and lower mounting units of the frame assembly through a suspension;

a steering assembly provided to one side of the frame assembly and being connected to the wheel mounting assembly of the wheel assembly, the steering assembly performing a steering function through a rack-and-pinion operation;

a strut assembly including a shock absorber and a suspension spring and being provided between the wheel assembly and the frame assembly, the strut assembly being able to undergo variations in mounting positions and length between the struts assembly's connection to the wheel mounting assembly of the wheel assembly and the upper mounting unit of the frame assembly; and an arm assembly including a plurality of arms and links and being provided between the wheel assembly and the frame assembly, the arm assembly being able to undergo variations in mounting positions and length between the arm assembly's connection to the wheel mounting assembly of the wheel assembly and the lower mounting unit of the frame assembly.

2. The system of claim 1 wherein the upper unit is provided on upper ends of the slide bars and comprises:
a mounting plate that extends from one slide bar to the other and is fixed to upper ends thereof; and
adjustable mounts, each of which is fixed to an opposite end of the mounting plate, one end of each of the adjustable mounts including one connecting slots and a pair of slide slots for enabling fixing and position adjustment on the mounting plate, and connecting slots being formed on opposite ends of the adjustable mounts to which the strut assembly is connected.

3. The system of claim 1 wherein the lower mounting unit is realized through an arm connecting plate that passes through one of the receiving slots in the skirt and a corresponding receiving slot in the opposing skirt, the first arm connecting plate including connecting slots that are formed at a predetermined length along a longitudinal direction of the arm connecting plate and on both ends thereof, and the arm connecting plate including a threaded bolt hole at a center position thereof, a bolt being screwed into the bolt hole unit making close contact with the base plate to fix a position of the arm connecting plate.

4. The system of claim 1 wherein the wheel member of the wheel assembly is a circular plate made of a transparent plastic material.

5. The system of claim 1 wherein the wheel mounting assembly of the wheel assembly comprises:
a connecting bracket, which is coupled to the wheel member through a plurality of bolts as a position slightly below a center of the wheel member;
a knuckle bracket, which is connected to the wheel member through a plurality of bolts at a position slightly above the center of the wheel member, a lower end of the strut assembly being connected to the knuckle bracket; and
a knuckle plate fixed to a rear portion of the knuckle bracket and having a slot for connection with the steering assembly.

6. A system for analyzing a suspension system comprising:
a frame assembly including a plurality of frame units, a base plate, a lower mounting unit, and an upper mounting unit
a wheel assembly including a wheel member that functions as a wheel, and a wheel mounting assembly for enabling mounting of the wheel member to the upper and lower mounting units of the frame assembly through a suspension;
a steering assembly provided to one side of the frame assembly and being connected to the wheel mounting assembly of the wheel assembly, the steering assembly performing a steering function through a rack-and-pinion operation;
a strut assembly including a shock absorber and a suspension spring and being provided between the wheel assembly and the frame assembly, the strut assembly being able to undergo variations in mounting positions and length between the strut assembly's connection to the wheel mounting assembly of the wheel assembly and the upper mounting unit of the frame assembly; and
an arm assembly including a plurality of arms and links and being provided between the wheel assembly and the frame assembly, the arm assembly being able to undergo variations in mounting positions and length between the arm assembly's connection to the wheel mounting assembly of the wheel assembly and the lower mounting unit of the frame assembly;
wherein the steering assembly is mounted on the base plate and comprises:
a rack bar that extends in a longitudinal direction of the base plate, and which undergoes rectilinear motion while being guided by a guide, the rack bar including a rack segment that is formed at a center thereof and at a predetermined length, and adjustable segments formed on both ends of the rack bar;
a pinion meshed with the rack segment of the rack bar;
a rotating bar passed through a center of the pinion, one end of the rotating bar being rotatably connected to a support bracket, which is fixed to the base plate, and a control knob being formed on the rotating bar's other end; and a knuckle arm connected via a universal joint to each extreme end of the rack bar, ball joints being provided at the ends of the knuckle arms, the ball joint corresponding to the side of the system being used, and being connected to the wheel mounting assembly of the wheel assembly.

7. The system of claim 6 wherein the adjustable segments of the rack bar comprise:

a hollow tube that has a groove of a large width formed along a predetermined length of the hollow tube; and a rod, a majority of which is slidably provided within the hollow tube, a threaded bolt hole being formed in the rod, and a fixing bolt being screwed into the bolt hole via the groove of the hollow tube.

8. The system of claim 6 wherein the shock absorber of the strut assembly comprises:

a housing, which is a hollow tube and includes a lower spring seat integrally formed on an upper end thereof;

a piston rod passed through the lower spring seat into the housing; and an upper spring seat integrally formed to an upper end of the piston rod, and wherein the suspension spring of the strut assembly is interposed between the lower spring seat and the upper spring seat, and is made of a plastic material.

9. The system of claim 6 wherein the assembly comprises:

an A-shaped arm link, which includes a plurality of slots and is connected to the wheel mounting assembly of the wheel assembly through a ball joint; and a plurality of adjustable arms connected to the slots of the A-shaped link through ball joints, opposite ends of the adjustable arms being connected to the lower mounting unit of the wheel assembly through ball joints, the adjustable arms able to undergo variations in length.

10. The system of claim 9 wherein each of the adjustable arm comprises:

a hollow tube;

threaded inserts of a predetermined length fixed within opposite ends of each of the adjustable arms; and bolts screwed into the threaded inserts, the ball joints connected to the A-shaped link being integrally formed to distal ends of the bolts, the threading of the bolts in relation of the inserts being such to allow the length of the adjustable arms to be varied by manually rotating the hollow tube portion of the adjustable arms.

* * * * *